United States Patent
Gharda

(10) Patent No.: US 9,587,110 B2
(45) Date of Patent: Mar. 7, 2017

(54) POLYMERIC BLEND

(71) Applicant: Keki Hormusji Gharda, Maharashtra (IN)

(72) Inventor: Keki Hormusji Gharda, Maharashtra (IN)

(*) Notice: Subject to any disclaimer, the term of this patent is extended or adjusted under 35 U.S.C. 154(b) by 0 days.

(21) Appl. No.: 14/389,646

(22) PCT Filed: Mar. 28, 2013

(86) PCT No.: PCT/IN2013/000206
§ 371 (c)(1),
(2) Date: Sep. 30, 2014

(87) PCT Pub. No.: WO2013/164854
PCT Pub. Date: Nov. 7, 2013

(65) Prior Publication Data
US 2015/0080502 A1    Mar. 19, 2015

(30) Foreign Application Priority Data

Mar. 30, 2012 (IN) .................. 1023/MUM/2012

(51) Int. Cl.
*C08L 71/00* (2006.01)
*C08G 73/18* (2006.01)
*C08L 79/04* (2006.01)

(52) U.S. Cl.
CPC .............. *C08L 71/00* (2013.01); *C08G 73/18* (2013.01); *C08L 79/04* (2013.01); *C08G 2650/40* (2013.01); *C08L 2201/08* (2013.01)

(58) Field of Classification Search
CPC .......... C08L 61/00; C08L 79/06; C08L 27/18; C08L 71/00; C08L 79/04; C08K 3/04; C08K 5/56; C08G 73/18
See application file for complete search history.

(56) References Cited

U.S. PATENT DOCUMENTS

| 4,912,176 A | 3/1990 | Alvarez et al. |
| 5,391,605 A | 2/1995 | Andres et al. |
| 2007/0065699 A1* | 3/2007 | Larson et al. .................. 429/33 |
| 2011/0104417 A1* | 5/2011 | Wang et al. .................. 428/36.9 |

FOREIGN PATENT DOCUMENTS

| CN | 102196856 A | 9/2011 |
| WO | 93/23475 A1 | 11/1993 |

OTHER PUBLICATIONS

Asensio et al. Recent Developments on Proton Conducting Poly(2,5-benzimidazole) (ABPBI) Membranes for High Temperature Polymer Electrolyte Membrane Fuel Cells. Fuel Cells 2005, 5, No. 3.*
Zheng et al. Proton exchange membranes based on poly(2,5-benzimidazole) and sulfonated poly(ether ether ketone) for fuel cells. Journal of Power Sources 208 (2012) 176-179. Feb. 19, 2012.*
International Search Report for corresponding International Application No. PCT/IN2013/000206, mailed Nov. 21, 2013 (3 pages).
Abstract of H. Zheng et al.; "Proton exchange membranes based on poly(2,5-benzimidazole) and sulfonated poly(ether ether ketone) for fuel cells." Journal of Power Sources, vol. 208; Feb. 19, 2012 (1 page).
Written Opinion for corresponding International Application No. PCT/IN2013/000206, mailed Nov. 21, 2013 (5 pages).

* cited by examiner

Primary Examiner — John Uselding
(74) Attorney, Agent, or Firm — Osha Liang LLP

(57) ABSTRACT

The present disclosure relates to a polymer composition comprising a polymer blend of Polyaryl Ether Ketone (PAEK) and Poly(2,5-benzimidazole) characterized with enhanced mechanical and wear resistance properties as compared to commercial polymer blends of Polyaryl Ether Ketone and Polybenzimidazole. The present disclosure also relates to shaped articles derived from the polymer composition of the present disclosure.

9 Claims, No Drawings

POLYMERIC BLEND

FIELD OF THE DISCLOSURE

The present disclosure relates to a polymer composition comprising a blend of Polyaryl Ether Ketone and Polybenzimidazole polymers.

BACKGROUND

Polyaryl Ether Ketone (PAEK) forms a family of semi-crystalline thermoplastics with high-temperature stability and high mechanical strength: PAEKs have continuous operating temperatures of 250-280° C., but under short-term loads can function up to about 350-380° C. When subjected to flame, PAEKs have the least toxic and corrosive fumes. PAEKs also have low heat and smoke output under flame, so PAEKs qualify for use in interior aviation applications. PAEKs also demonstrates very good overall chemical resistance. Their tensile strength is of over 85 MPa (12,300 psi) and a Young's modulus of over 4,100 MPa (590,000 psi), making them very strong contenders for metal replacements.

PAEK plastics are characterized by phenylene rings that are linked via oxygen bridges (ether) and carbonyl groups (ketone). The ratio of ether to ketones and their sequence mainly affect the glass transition temperature and melting point of the polymer. They also affect heat resistance and processing temperature. The higher the ratio of ketones to ether, more rigid the polymer chain, which results in a higher glass transition temperature and melting point.

Polyaryl Ether Ketone polymers comprise a number of closely related polymers which include Polyether Ketone (PEK), Polyether Ether Ketone (PEEK), Polyether Ketone Ketone (PEKK), Polyether Keton Ether Ketone Ketone (PEKEKK) and Polyether Ether Ketone Ketone (PEEKK). These polymers are moldable, and thus easily formed into usable parts.

Polybenzimidazole (PBI) is a polymer with extremely high temperature stability. It does not readily ignite and has high chemical resistance. Due to its exceptional thermal and chemical stability, it finds usage where these properties are important. Recently, PBI has received much attention for its use as a high temperature fuel cell membrane. There are two important types of Polybenzimidazole structures: One, also known as ABPBI, is a polymer of 3,4 Diamino Benzoic acid. While commercially available PBI is a polymer of 2,2' 5,5' Diamino Biphenyl with Isophthalic Anhydride or its derivatives. ABPBI, though known in literature has found no commercial usage because of its extremely high Glass Transition Temperature range of 450 to 485° C.

Polybenzimidazole and Polyaryl Ether Ketone blends are known for their excellent mechanical, thermal and chemical resistance properties. U.S. Pat. No. 4,912,176 discloses blends of Poly-2,2'-(m-phenylene)-5,5'-bibenzimidazole and Polyarylene Ketones.

U.S. Pat. No. 5,391,605 discloses a polymeric composition comprising from about 65 to about 85 weight percent of a polymeric blend and from about 15 to about 35 weight percent of internal lubricants. The blend consists of from about 35 to about 100 weight percent of an aromatic Polybenzimidazole and from about 0 to about 65 weight percent of Poly(aryl Ether Ketone). The lubricants consist of boron nitride powder and graphite in a weight ratio of about 1:10 to about 10:1.

It is found that the known Polybenzimidazole (PBI) and Polyaryl Ether Ketone blends do not provide very good mechanical and wear resistance properties. Accordingly, it is desirable to develop a composition comprising a blend of Polybenzimidazole and Polyaryl Ether Ketone, which provides higher mechanical and wear resistance properties to the articles made therefrom.

OBJECTS

Some of the objects of the present disclosure, which at least one embodiment herein satisfies, are as follows:

It is an object of the present disclosure to ameliorate one or more problems of the prior art or to at least provide a useful alternative.

It is another object of the present disclosure to provide a composition comprising a blend of Polyaryl Ether Ketone (PAEK) and Polybenzimidazole polymers, wherein the composition possesses excellent mechanical and wear resistance properties.

It is still another object of the present disclosure to provide a composition comprising a blend of Polyaryl Ether Ketone and Polybenzimidazole polymers that further comprises various additional components such as inorganic and organic fibers and/or fillers to provide enhanced mechanical properties to the polymer composition.

It is a yet another object of the present disclosure to provide articles possessing excellent mechanical and wear resistance properties derived from a composition comprising a blend of Polyaryl Ether Ketone and Polybenzimidazole polymers.

Other objects and advantages of the present disclosure will be more apparent from the following description, which are not intended to limit the scope of the present disclosure.

SUMMARY

In accordance with the present disclosure there is provided a polymer composition comprising a polymer blend of Poly(2,5-benzimidazole) (ABPBI) and Polyaryl Ether Ketone (PAEK), wherein Poly(2,5-benzimidazole) to Polyaryl Ether Ketone ratio varies between 90:10 and 10:90.

Typically, the ratio of ABPBI to Polyaryl Ether Ketone varies between 60:40 to 10:90, preferably between 40:60 and 20:80.

Typically, the Polyaryl Ether Ketone is Polyether Ketone (PEK) characterized with inherent viscosity in the range of 0.6 to 1.5 dl/g, preferably in the range 0.8 to 1.2 dl/g.

Typically, the ABPBI is characterized with inherent viscosity in the range of 0.6 to 3.0 dl/g, preferable in the range of 0.8 to 2.5 dl/g, more preferably in the range of 0.8 to 1.5 dl/g.

Typically, the polymer composition in accordance with the present disclosure further comprises Zirconium IV2,2-bis(2-propenyloxymethyl)butanolato,tris(dodecyl benzenesulfonato-O) as a coupling agent and an antioxidant that includes phosphite antioxidant.

Preferably, the coupling agent is used in an amount varying between 0.1 to 1% by weight, with respect to the total weight of the polymer composition.

Typically, the polymer composition of the present disclosure further comprises at least one additional component selected from the group consisting of carbon fibers, glass fibers, aramid fibers, glass beads, mineral fillers such as wallastonite, wool, carbon nano-tubes, Polytetrafluoroethylene (PTFE), graphite, Molybidinum Disulfide ($MOS_2$) and Boron Nitride.

Typically, the additional component is at least one of carbon fibers in an amount of up to 40% by weight, carbon nano-tubes in an amount of up to 10% by weight, glass fiber glass beads in an amount of up to 60% by weight, PTFE in an amount of up to 30% by weight and graphite and/or Boron Nitride in an amount of up to 20% by weight, each of said individual amounts being with respect to the total weight of the polymer composition.

Preferably, the additional components comprises carbon fibers, graphite and PTFE in a total amount of up to 30% by weight, with respect to the total weight of the polymer composition, said individual additional components being present in equal weight proportions.

Typically, the polymer composition in accordance with the present disclosure is capable of being extruded in the form of granules and further injection molded or extruded in various shaped articles that includes at least one one selected from the group consisting of stock shape of rods, plates, cable connectors, sheeth, pipes, tubings and films.

DETAILED DESCRIPTION

The description herein after the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

In accordance with one aspect, the present disclosure provides a polymer composition that comprises a blend of Polyaryl Ether Ketone (PAEK) and Polybenzimidazole polymers in a pre-determined weight proportion. The polymer composition of the present disclosure comprising the blend of the polymers in a pre-determined weight proportion, demonstrates excellent mechanical and wear resistance properties. The polymer composition of the present disclosure further comprises an optional addition of at least one coupling agent to improve the miscibility or the interfacial adhesion of the polymers.

The Polyaryl Ether Ketone polymer used for the purpose of the present disclosure comprises at least one polymer selected from the group consisting of Polyether Ketone, Polyether Ether Ketone, Polyether Ketone Ether Ketone Ketone and Polyether Ether Ketone Ketone polymers. The preferred Polyaryl Ether Ketone polymer suitable for the purpose of the present disclosure is Polyether Ketone (PEK).

The polybenzimidazole polymer used for the purpose of the present disclosure is preferably Poly(2,5-benzimidazole) (ABPBI).

The proportion of ABPBI to Polyether Ketone polymer in the polymer composition of the present disclosure ranges between 90:10 to 10:90, preferably between 60:40 to 10:90, and more preferably between 40:60 to 20:80.

The Polyether Ketone polymer used for the purpose of the present disclosure is characterized with inherent viscosity ranging between 0.6 and 2.0 dl/g, preferably between 0.9 and 1.2 dl/g; the inherent viscosity of the Poly (2,5-benzimidazole) ranges between 0.65 and 3.5 dl/g, preferably between 0.8 and 1.5 dl/g, and more preferably between 0.9 and 1.2 dl/g.

As above described, the polymer composition of the present disclosure optionally comprises at least one coupling agent to enhance the interfacial adhesion between the polymers. The coupling agent suitable for the purpose of the present disclosure is Zirconium IV 2,2-bis(2-propenyloxymethyl)butanolato,tris(dodecyl benzenesulfonato-O) (Ken-react NZ 09) and used in an amount varying between 0.1 to 1%. Further to the coupling agent, the polymer composition of the present disclosure also comprises antioxidants that include phosphite antioxidant.

The polymer composition of the present disclosure further comprises at least one additional component which are suitable for incorporation into the blend of Polyether Ketone and Poly(2,5-benzimidazole) to further improve the overall mechanical properties of the polymer composition. The additional components may comprise inorganic and organic fibers and/or fillers, for example, glass fibers, carbon fibers and the like.

In accordance with one of the embodiments of the present disclosure, the polymer composition further comprises at least one additional component selected from the group consisting of carbon fibers, glass fibers, aramid fibers, glass beads, mineral fillers such as wallastonite, wool, carbon nano-tubes, Polytetrafluoroethylene (PTFE), graphite, Molybidinum Disulfide ($MOS_2$) and Boron Nitride.

The individual weight proportions of each of said additional components in the polymer composition, of the present disclosure are as follows: carbon fibers up to 40% by weight, carbon nano-tubes up to 10% by weight, glass fiber and/or glass beads up to 60% by weight, PTFE up to 30% by weight and graphite and/or Boron. Nitride up to 20% by weight, all weight proportions being with respect to the total weight of the polymer composition. However, it is preferred that the total proportion of additional components varies between 0.5% to 60% by weight, with respect to the total weight of the polymer composition.

In accordance with one of the preferred embodiments of the present disclosure, the additional component comprises carbon fiber, graphite and PTFE in a total amount of up to 30% by weight, with respect to the total weight of the polymer composition. Each of the additional components are present in equal weight proportions.

Another aspect the present disclosure provides a process for preparing a polymer composition comprising a blend of Polyaryl Ether Ketone (PAEK) and Polybenzimidazole polymers.

The process in accordance with the present disclosure comprising a method step of intimately mixing Polyaryl Ether Ketone and Polybenzimidazole polymers in a pre-determined weight proportion to obtain a homogenous and dry polymer blend.

The Polyaryl Ether Ketone polymer used for the purpose of the present disclosure comprises at least one polymer selected from the group consisting of Polyether Ketone, Polyether Ether Ketone, Polyether Ketone Ether Ketone Ketone, Polyether Ether Ketone Ketone polymers. The preferred Polyaryl Ether Ketone suitable for the purpose of the present disclosure is Polyether Ketone (PEK).

The polybenzimidazole polymer used for the purpose of the present disclosure is preferably Poly(2,5-benzimidazole).

The Polyether Ketone and Poly (2,5-benzimidazole) are mixed in a pre-determined weight proportion. The mixing of the polymers may be carried out in a suitable mixing machine to effect the powder particle/melt blending. In accordance with a particular preferred method, the polymers in dry powder form are mixed together using suitable powder blending techniques such as high speed mixer. The polymers in accordance with the process of the present disclosure are mixed by using a high speed mixture for a time period varying from 5-60 minutes at rpm of 250 and at ambient temperature to obtain a homogeneous and dry blend of polymers. The polymers are typically used in dry powder form having particle size <100 microns.

The obtained polymer blend is extrudable as granules. The process in accordance with the present disclosure further comprising a method step of extruding the polymer blend to obtain strands which are chopped to give granules. The extrusion of the polymer blend is accomplished by using a twin compounding extruder at a temperature ranging between 420° C. to 430° C.

The process of the present disclosure optionally further comprising a method step of adding at least one coupling agent during the intimate mixing of the polymers. The coupling agent suitable for the purpose of the present disclosure is Zirconium IV2,2-bis(2-propenyloxymethyl/butanolato,tris(dodecyl benzenesulfonato-O).

The extruded polymer blend in accordance with the present disclosure can be used as such, or can be further compounded by adding at least one additional component selected from the group consisting of carbon fibers, glass fibers, aramid fibers, glass beads, mineral fillers such as wallastonite, wool, carbon nano-tubes, Polytetrafluoroethylene (PTFE), graphite, Molybidinum Disulfide ($MOS_2$), Boron Nitride. The polymer blend extruded as granules is further used to produce shaped articles by employing suitable article forming operations such as injection moulding or further extrusion to make stock shapes like rods, pipes, plates and the like. To make test specimens to measure mechanical, thermal and flow properties, the granules can be directly injection molded or specimens can be cut from a plate or sheet using a CNC machines.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example 1

Polyether Ketone (PEK) and Poly(2,5-benzimidazole) (APBPI) are available from Gharda Chemicals Ltd. And were used as received, for the preparation of polymer blends and for evaluation as given below.

Polyether Ketone/Poly(2,5-benzimidazole) Blends in unreinforced form were prepared by mixing fine powder of Poly(2,5-benzimidazole) (<100 microns particle size) with that of fine powder of Poly Ether Ketone (PEK) (<100 microns particle size). The PEK:ABPBI ratio used was 60:40 by weight. The mixture was kept in a high speed mixer for a period varying from 5-60 minutes at rpm of up to 250 at ambient temperature. The dry powder so mixed was then melt blended on a Coperion ZSK 26 twin screw extruder having L/D ratio of 40:1. Temperatures used for melt blending was 420-430 deg C. The PEK: ABPBI blend was then Injection moulded on an Arbug machine at 420-430 deg C. with a mould temperature of 220-240 deg C. The tests specimen so obtained were conditions for 24 hours according to ASTM Standards requirement before testing for physical, mechanical and thermal properties. Table 1 gives the mechanical properties of the polymer blend.

Example 2

In this example, PEK:ABPBI blend was prepared as in example 1 using ratio of PEK:ABPBI of 70:30. The result of blend so prepared is given in Table 1.

Example 3

In this example, PEK:ABPBI blend was prepared as in example 1 using ratio of PEK:ABPBI of 80:20. The result of blend so prepared are given in Table 1.

TABLE NO. 1

PEK/PBI Blends: Properties of unfilled grades

| Properties | Unit | PEK + ABPBI 80:20 | PEK + ABPBI 70:30 | PEK + ABPBI 60:40 |
|---|---|---|---|---|
| Tensile Strength | Mpa | 82 | 80 | 80 |
| Tensile Modulus | Mpa | 5100 | 5500 | 6300 |
| Elongation at break | | 2.5 | 2.6 | 1.7 |
| Flexural Strength | Mpa | 170 | 162 | 132 |
| Flexural Modulus | Mpa | 5450 | 5300 | 6600 |
| Compression Strength | Mpa | 134 | 146 | 166 |
| Compression Modulus | Mpa | 2215 | 2440 | 2600 |
| Impact Strength | J/m | 31 | 30 | 30 |
| MVR @ 400° C., 6 min & 5 Kg | CC/10 min | 1.2 | 0.8 | 0.5 |

Example 4

In this example, PEK:ABPBI blend was prepared as in example 1 to 3 but by optionally adding an antioxidant, for example, phosphite antioxidant and/or a coupling agent, for example, Zirconium IV 2,2-bis(2-propenyloxymethyl)butanolato,tris(dodecyl benzenesulfonato-O) (Ken-react NZ 09) at the time of dry mixing.

Example 5

A base of PEK and ABPBI blend of 80:20 ratio was prepared as per procedure specified in Example 3. The blend was further reinforced with Glass Fiber in blend:Glass fiber weight ratio of 70:30 on a ZSk 26 twin screw extruder at 410-430 deg C. The reinforced blend so prepared was then Injection Moulded on Arburg Injection moulding machine at 420-430 deg C. injection temperature and 220-240 deg C. mould temperature. The blend composites are further tested for Physical, mechanical and thermal properties (Table 2)

Example 6

A base PEK:ABPBI blend of 80:20 ratio, prepared as per Example 3, was re-extruded with Carbon Fiber added to give 70:30 weight ratio of blend to Carbon fiber. It was the injection molded and tested to give properties as given in Table 2.

Example 7

A base PEK:ABPBI blend as per Example 3 was re-extruded with adding a mix of Carbon Fiber, Graphite and PTFE of equal weight to give blend to lubricating & reinforcing filler ratio of 70:30. It was then injection molded and evaluated for properties as given in Table 2.

TABLE NO. 2

PEK/ABPBI Blends: Properties of filled grades made using a polymer composition comprising a polymer blend of PEk abd ABPBI in the ratio of 80:20.

| Properties | units | PEK/ABPBI (80:20) 30% Glass Fiber | PEK/ABPBI (80:20) 30% Carbon Fiber | PEK/ABPBI (80:20) 30% mixture of carbon fiber, graphite and PTFE |
|---|---|---|---|---|
| Sp. Gravity | | 1.53 | 1.4 | 1.42 |
| Tensile Strength | MPa | 172 | 202 | 121 |
| Tensile Modulus | MPa | 15200 | 22675 | 22200 |
| Elongation at Break | % | 2.2 | 2.4 | 1.2 |
| Flexural Strength | MPa | 270 | 330 | 200 |
| Flexural Modulus | MPa | 13950 | 24650 | 17300 |
| Impact Strength (Notched) | J/m | 42 | 40 | 30 |
| Spiral Flow length | mm | 45 | 36 | 37 |

Example 8

PEK/ABPBI blend of the present disclosure comprising PEK/ABPBI in the ratio of 60:40 was compared for physical, mechanical properties with that of commercial sample of PEEK/PBI blend (alleged ratio of 50:50) of PBI Performance Materials, USA (Celazole TU 60). The comparative properties are tabulated in Table 3. CelazoleTU 60 consists of a commercial PEEK and PBI from PBI performance Products. ABPBI is Poly (2,5 Benzimidazole) and PBI is Poly-2,2'-(m-phenylene)-5,5'-bibenzimidazole, while PEEK is Polyether Ether Ketone and PEK is Polyether Ketone.

TABLE NO. 3

Comparative properties

| PROPERTY | UNITS | Blend of PEK/ABPBI (60:40) | Celazole TU-60 |
|---|---|---|---|
| Tensile Strength | Mpa | 85 | 95-100 |
| Tensile Modulus | MPa | 5600 | 5000 |

TABLE NO. 3-continued

Comparative properties

| PROPERTY | UNITS | Blend of PEK/ABPBI (60:40) | Celazole TU-60 |
|---|---|---|---|
| Elongation at Break | % | 2.0 | 2-3 |
| Flexural Strength | MPa | 143 | 185 |
| Flexural Modulus | Mpa | 6100 | 4500 |
| Impact Strength | J/m | 25 | 30 |
| MVR @ 400° C., 5.0 kg Load & 6 min preheating Time | Cc/10 min | 5.2 | 3.0 |

A series of further comparative studies using Dynamic Mechanical Analyser (DMA) was conducted on the PEK/ABPBI blends of the present disclosure and Celazole TU 60 (PEEK/PBI commercial blend). The comparative results of the studies are shown in Table 4.

TABLE NO. 4

Dynamic Mechanical Analyser Comparasion of PEK/ABPBI blend of the present disclosure and commercial blend (Celazole TU-60).

Storage Modulus (MPa) at different temperature

| Temperature (° C.) | 30 | 100 | 150 | 175 | 200 | 250 | 300 |
|---|---|---|---|---|---|---|---|
| PEK/ABPBI (60:40) | 5500 | 4900 | 3050 | 1750 | 1022 | 870 | 501 |
| Celazole TU-60 | 4800 | 4200 | 3001 | 1504 | 989 | 800 | 485 |

Comparative results of dynamic mechanical analysis at temperature range of 30 to 300 deg C., indicating higher storage modulus of PEK/ABPBI blend of the present disclosure throughout the temperature range.

Example 9

PEK:ABPBI blend was prepared as in Example 3 and injection molded to give bars. These bars were cut suitably in smaller pieces to study specific wear rate and coefficient of friction using CETR, USA make Tribometer along with those of commercial blend (Celazole TU60). The results are tabulated in Table 5.

TABLE NO. 5

Wear Properties of a PEK/ABPBI (60:40) blend of the present disclosure Vs. Commercial blend (Celazole TU 60).
Test parameters: Speed: 1 m/s; rpm: 40; and Time: 1 hour.

| Load (N) | Wear (gm) | | Sp. Wear Rate (Ko) $(m^3/Nm) \times 10^{(-14)}$ | | CoF ($\mu$) | | PV(MPa-m/s) | |
|---|---|---|---|---|---|---|---|---|
| | PEK:ABPBI (60:40) | Celazole Tu 60 | PEK:ABPBI (60:40) | Celazole Tu 60 | PEK:ABPBI (60:40) | Celazole Tu 60 | PEK:ABPBI (60:40) | Celazole Tu 60 |
| 100 | 0.0014 | 0.0067 | 0.289 | 1.445 | 0.385 | 0.328 | 3.1 | 3.1 |
| 150 | 0.0018 | 0.0140 | 0.288 | 2.03 | 0.355 | 0.325 | 4.65 | 4.65 |
| 200 | 0.0022 | 0.0282 | 0.235 | 3.08 | 0.295 | 0.303 | 6.2 | 6.2 |
| 300 | 0.0114 | — | 0.813 | — | 0.305 | — | 9.3 | — |
| 400 | 0.0163 | — | 0.872 | — | 0.248 | — | 12.4 | — |
| 600 | 0.0186 | — | 0.67 | — | 0.196 | — | 18.6 | — |
| 700 | 0.030 | — | 0.918 | — | 0.219 | — | 21.7 | — |

The polymer composition comprising the polymer blend of PEK and ABPBI (60:40) showed overall far superior properties as compared to the commercial blend (Celazole TU 60) for both specific wear rate and coefficient of friction, and could surprisingly withstand much higher load too before wearing off.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

Technical Advancement

The present disclosure relates to a polymer composition comprising a polymer blend of Polyaryl Ether Ketone (PAEK) and Poly(2,5-benzimidazole) (ABPBI) has the following technical advancements:

Providing a polymer composition comprising a blend of Polyaryl Ether Ketone (PAEK) and Poly(2,5-benzimidazole) (ABPBI) polymers that demonstrates excellent mechanical and wear resistance properties as compared to commercial blends, and Providing articles/shaped articles with excellent mechanical and wear resistance properties made from a polymer composition comprising a polymer blend of Polyaryl Ether Ketone (PAEK) and Poly(2,5-benzimidazole) (ABPBI) polymer.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A polymer composition comprising a polymer blend of Poly(2,5-benzimidazole) (ABPBI) and Polyether Ketone (PEK), the PEK having a melt viscosity in the range of 250 Pa·s to 300 Pa·s, prepared by melt blending ABPI and PEK at a temperature in the range of 420° C. to 430° C., wherein Poly(2,5-benzimidazole) to Polyether Ketone ratio varies between 20:80 and 60:40.

2. The polymer composition as claimed in claim 1, wherein said Polyether Ketone (PEK) is characterized with inherent viscosity in the range of 0.6 to 1.5 dL/μm.

3. The polymer composition as claimed in claim 1, wherein said Poly(2,5-benzimidazole) is characterized with inherent viscosity in the range of 0.6 to 3.0 dL/gm.

4. The polymer composition as claimed in claim 1 further comprises at least one coupling agent that includes Zirconium IV 2,2-bis(2-propenyloxymethyl)butanolato,tris(dodecyl benzenesulfonato-O), and an antioxidant that includes phosphite antioxidant.

5. The polymer composition as claimed in claim 1, wherein Zirconium IV 2,2-bis(2-propenyloxymethyl)butanolato,tris(dodecyl benzenesulfonato-O) is present in an amount varying between 0.1 to 1% by weight, with respect to the total weight of the polymer composition.

6. The polymer composition as claimed in claim 1 further comprises at least one additional component selected from the group consisting of carbon fibers, glass fibers, aramid fibers, glass beads, wollastonite, wool, carbon nano-tubes, Polytetrafluoroethylene (PTFE), graphite, Molybdenum Disulfide ($MOS_2$) and Boron Nitride.

7. The polymer composition as claimed in claim 6, wherein the additional component is at least one of carbon fibers in an amount of up to 40% by weight, carbon nano-tubes in an amount of up to 10% by weight, glass fibers in an amount of up to 60% by weight, glass beads in an amount of up to 60% by weight, PTFE in an amount of up to 30% by weight and graphite in an amount of up to 20% by weight and Boron Nitride, each of said individual amounts being with respect to the total weight of the polymer composition.

8. The polymer composition as claimed in claim 6, wherein the additional components comprises a mixture of carbon fibers, graphite and PTFE in a total amount of 30% by weight, with respect to the total weight of the polymer composition, said individual additional components being present in equal weight proportions.

9. The polymer composition as claimed in claim 1 is capable of being extruded in the form of granules and further injection molded or extruded in various shaped articles that includes at least one selected from the group consisting of stock shape of rods, plates, cable connectors, sheath, pipes, tubings and films.

* * * * *